United States Patent
Rinehart et al.

(10) Patent No.: US 11,265,484 B1
(45) Date of Patent: Mar. 1, 2022

(54) SYSTEMS AND METHODS FOR AUTOMATIC EXPOSURE OF IMAGES

(71) Applicant: Waymo LLC, Mountain View, CA (US)

(72) Inventors: Matthew Rinehart, San Mateo, CA (US); Vlad Cardei, Redwood City, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 17/124,205

(22) Filed: Dec. 16, 2020

(51) Int. Cl.
*H04N 5/243* (2006.01)
*H04N 5/235* (2006.01)
*B60R 11/04* (2006.01)

(52) U.S. Cl.
CPC .............. *H04N 5/243* (2013.01); *B60R 11/04* (2013.01); *H04N 5/2351* (2013.01)

(58) Field of Classification Search
CPC ....................................................... B60R 11/04
See application file for complete search history.

(56) References Cited

U.S. PATENT DOCUMENTS

| | | | |
|---|---|---|---|
| 4,731,671 A | 3/1988 | Alkofer | |
| 5,265,200 A | 11/1993 | Edgar | |
| 7,085,008 B2 | 8/2006 | Weldy | |
| 7,245,320 B2 | 7/2007 | Kaplinsky et al. | |
| 8,228,422 B2 | 7/2012 | Cha et al. | |
| 8,792,049 B2 | 7/2014 | Tay et al. | |
| 8,982,237 B2 | 3/2015 | Chen | |
| 9,413,976 B2 | 8/2016 | DiCarlo | |
| 9,432,589 B2 | 8/2016 | Kuang et al. | |
| 10,425,599 B2 | 9/2019 | Swami et al. | |
| 10,560,629 B2 | 2/2020 | Duran et al. | |
| 2012/0162467 A1* | 6/2012 | Nakamura | H04N 5/353 348/229.1 |

FOREIGN PATENT DOCUMENTS

CN              106791475 A       5/2017

OTHER PUBLICATIONS

Bernacki, "Automatic Exposure Algorithms for Digital Photography", Multimedia Tools and Applications, Jan. 22, 2020.

* cited by examiner

*Primary Examiner* — Nelson D. Hernández Hernández
(74) *Attorney, Agent, or Firm* — McDonnell Boehnen Hulbert & Berghoff LLP (57) ABSTRACT

An example method includes capturing, by an image capture device, a first image having a plurality of pixels. Each pixel includes a plurality of channels, and the first image is captured in accordance with first exposure parameters. The method includes determining, by a controller of the image capture device, average pixel intensities for each of the plurality of channels. The method includes determining, by the controller, a weighted average of pixel intensities using the average pixel intensities. The method includes setting, by the controller, a gain that is proportional to a ratio of a desired average pixel intensity relative to the weighted average of pixel intensities. The method includes setting, by the controller, second exposure parameters for a second image based on the gain. The method includes capturing, by the image capture device, the second image in accordance with the second exposure parameters.

20 Claims, 9 Drawing Sheets

SYSTEMS AND METHODS FOR AUTOMATIC EXPOSURE OF IMAGES

BACKGROUND

Unless otherwise indicated herein, the materials described in this section are not prior art to the claims in this application and are not admitted to be prior art by inclusion in this section.

Image capture devices, such as cameras, include an array of light detectors that sense light in accordance with exposure parameters (e.g., exposure time, gain, etc.). Forming an image using the array of light detectors involves sampling outputs from the light detectors to determine light intensities received at each point in the array. A multi-channel image (e.g., an RGB image) may have different light intensities for different channels (e.g., different color channels).

Lighting conditions in the environment may affect the usability of a multi-channel image for image processing operations such as edge detection and object detection. For example, one or more channels may become overexposed due to lighting conditions that cause a single channel to disproportionally affect automatic exposure of the image, and overexposure of the one or more channels may impede the image processing operations.

SUMMARY

In a first example, a method is described. The method includes capturing, by an image capture device, a first image having a plurality of pixels. Each pixel includes a plurality of channels, and the first image is captured in accordance with first exposure parameters. The method includes determining, by a controller of the image capture device, average pixel intensities for each of the plurality of channels. The method includes determining, by the controller, a weighted average of pixel intensities using the average pixel intensities. The method includes setting, by the controller, a gain that is proportional to a ratio of a desired average pixel intensity relative to the weighted average of pixel intensities. The method includes setting, by the controller, second exposure parameters for a second image based on the gain. The method includes capturing, by the image capture device, the second image in accordance with the second exposure parameters.

In a second example, image capture device is described. The image capture device includes a light detector array and a controller. The controller includes one or more processors, a memory, and program instructions stored in the memory and executable by the one or more processors to perform functions. The functions include capturing, by an image capture device, a first image having a plurality of pixels. Each pixel includes a plurality of channels, and the first image is captured in accordance with first exposure parameters. The functions include determining average pixel intensities for each of the plurality of channels. The functions include determining a weighted average of pixel intensities using the average pixel intensities. The functions include setting a gain that is proportional to a ratio of a desired average pixel intensity relative to the weighted average of pixel intensities. The functions include setting second exposure parameters for a second image based on the gain. The functions include capturing the second image in accordance with the second exposure parameters.

In a third example, a non-transitory computer readable medium is described. The non-transitory computer readable medium has instructions stored thereon, that when executed by one or more processors cause performance of functions. The functions include capturing, by an image capture device, a first image having a plurality of pixels. Each pixel includes a plurality of channels, and the first image is captured in accordance with first exposure parameters. The functions include determining average pixel intensities for each of the plurality of channels. The functions include determining a weighted average of pixel intensities using the average pixel intensities. The functions include setting a gain that is proportional to a ratio of a desired average pixel intensity relative to the weighted average of pixel intensities. The functions include setting second exposure parameters for a second image based on the gain. The functions include capturing the second image in accordance with the second exposure parameters.

Other aspects, embodiments, and implementations will become apparent to those of ordinary skill in the art by reading the following detailed description, with reference where appropriate to the accompanying drawings.

DETAILED DESCRIPTION

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features. Other embodiments can be utilized, and other changes can be made, without departing from the scope of the subject matter presented herein.

Thus, the example embodiments described herein are not meant to be limiting. Aspects of the present disclosure, as generally described herein, and illustrated in the figures, can be arranged, substituted, combined, separated, and designed in a wide variety of different configurations, all of which are contemplated herein.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

By the term "about" or "substantially" with reference to amounts or measurement values described herein, it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

I. Overview

An image capture device may capture images using one or more exposure parameters that are configured to produce a quality image. For example, a computing device associated with the image capture device may determine an average pixel intensity value that is desirable for images captured by the image capture device, and may adjust exposure parameters in order to achieve images with the desired pixel intensities. For example, these parameters may include one or more of an aperture, shutter speed, and detector sensitivity (e.g., an International Standards Organization (ISO) rating of the image capture device). Automatically adjusting exposure parameters in this manner is referred to as "automatic exposure," otherwise referred to as "auto exposure" or "AE." As used herein, the terms "automatically" or "auto" refer to an operation performed by, or caused to be performed by, a computing device without human input.

Adjusting the exposure parameters may include determining a gain for how much light is used when capturing an image relative to a previous image. For example, one or more of a shutter speed of the image capture device or a lens aperture of the image capture device may be adjusted to achieve the gain. However, in examples with multi-channel images (e.g., RGB images), one channel may reduce the average pixel values and may result in an unnecessarily large gain. An overlarge gain may result in one or more channels becoming overexposed, and having clipped pixels with truncated visual information. As used herein in the context of a pixel in an image, the term "clipped" refers to the pixel having an intensity that is above a maximum pixel intensity. This causes the pixel to be set at the maximum intensity by default, and results in a loss of information because an intensity of the pixel relative to other pixels is lost. Images with clipped pixels may lack detail, and may be less suitable for image processing operations, such as edge detection, object detection, or text detection operations.

In an example embodiment, a weighted average of pixel intensities is used for adjusting exposure parameters for an image capture device. The weighted average may include weights associated with each channel, the summation of which results in an output weighted average of pixels that more accurately represents the average pixel intensity and lessens or prevents clipping. For example, a luminosity function can be used to set the weights in the weighted average, which weights greens above reds, and which weights reds above blues (e.g., Weighted Average=0.2126*R+0.7152*G+0.0722*B). In this manner, the gain may be tailored more closely with perceived brightness in the image and avoid clipped pixels.

In an example embodiment, the weighted average is further refined based on determining that there is an outlier channel. For example, a blue channel may have significantly lower pixel intensities than either the red or green channels. A computing device may determine that the blue channel is an outlier based on comparing average pixel values in the blue channel to average pixel values in the red and green channels and determine that the average pixel values differ by a threshold amount (e.g., greater than or equal to 30% of a target pixel intensity for an auto exposed image). If the blue channel is determined to be an outlier, the weighted average can be altered to ignore the blue channel completely. For example, in the luminosity function example the weighted average would be updated as follows: Weighted Average=0.2486*R+0.7512*G+0.0*B). This may further reduce the chance of clipped pixels when exposing an image based on the weighted average.

Within examples, the weighted average in a first image can be used to auto expose a second image that directly follows the first image in a sequence of images captured by the image capture device. In this manner, a single image can be used to correct exposures in one or more subsequent images.

Within examples, determining the weighted average may be performed responsive to a prompt. For example, an operational condition of the image capture device or a system of the image capture device may prompt the weighted average for use in setting exposure parameters for the image capture device. The operational conditions may correspond to scenarios in which lighting causes intensities of one channel to become disproportionately large or small relative to the other channels. For an RGB image capture device, this may occur at a certain time of day (e.g., sunrise or sunset) or in particular settings or locations (e.g., tunnels or roadways with artificial lighting). In other examples the prompt may correspond to determining that one or more channels is overexposed. In this manner, an image capture device may adaptively shift from a first mode of auto exposure to a second mode of auto exposure, so that image processing operations on output images will more likely be effective.

II. Example Systems

Figure 1:
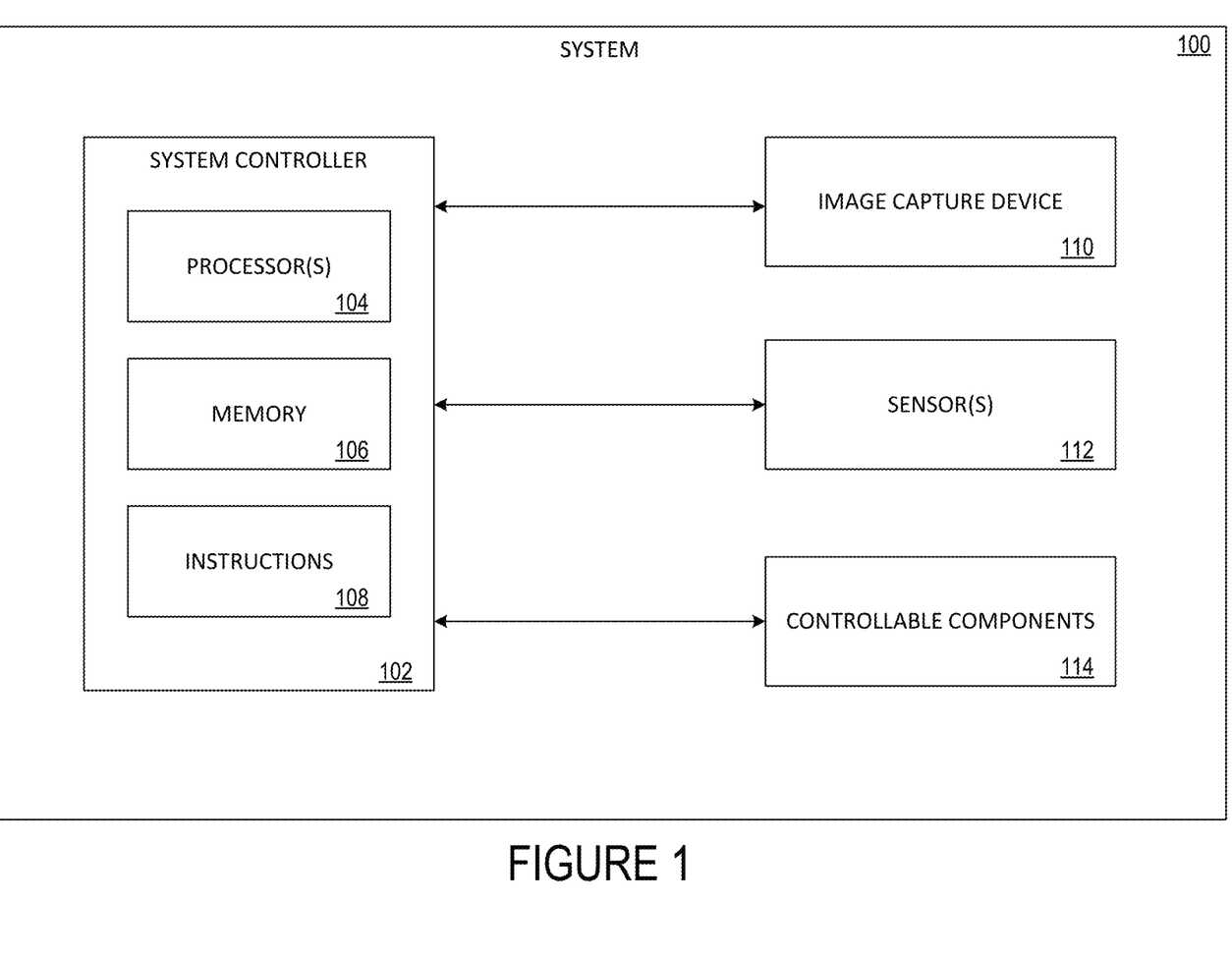
FIG. 1 is a block diagram of a system including an image capture device, according to an example embodiment.

FIG. 1 is a block diagram of a system including an image capture device, according to an example embodiment. In particular, FIG. 1 shows a system 100 that includes a system controller 102, an image capture device 110, one or more sensors 112, and a plurality of controllable components 114. System controller 102 includes processor(s) 104, a memory 106, and instructions 108 stored in the memory 106 and executable by the processor(s) 104 to perform functions.

The processor(s) 104 can include on or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out program instructions are contemplated herein.

The memory 106 may include a computer readable medium, such as a non-transitory computer readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The image capture device 110, described further below with respect to FIG. 2, includes light detectors configured to detect light. The image capture device 110 is configured to provide a two-dimensional (2D) array of data (e.g., an image) based on outputs of the light detectors. The system controller 102, in turn, may perform operations on the image to determine characteristics of an environment (e.g., edge detection, object detection, text detection, or the like).

Similarly, the system controller 102 may use outputs from the one or more sensors 112 to determine characteristics of the system 100 and/or characteristics of the environment. For example, the one or more sensors 112 may include one or more of a Global Positioning System (GPS), an Inertia Measurement Unit (IMU), a light sensor, a time sensor, and other sensors indicative of parameters relevant to the system 100 and/or the environment). The image capture device 110 is depicted as separate from the one or more sensors 112 for purposes of example, and may be considered a sensor in some examples.

Based on characteristics of the system 100 and/or the environment determined by the system controller 102 based on the outputs from the image capture device 110 and the one or more sensors 112, the system controller 102 may control the controllable components 114 to perform one or more actions. For example, the system 100 may correspond to a vehicle, in which case the controllable components 114 may include a braking system, a turning system, and/or an accelerating system of the of vehicle, and the system controller 102 may change aspects of these controllable components based on characteristics determined from the image capture device 110 and/or the one or more sensors 112 (e.g., when the system controller 102 controls the vehicle in an autonomous mode). Within examples, the image capture device 110 and the one or more sensors 112 are also controllable by the system controller 102. For example, system controller 102 may determine one or more operational parameters (e.g., a location of the system 100 or a time of day), and control an operation mode of the image capture device 110 based on the determined operational parameter.

Figure 2:
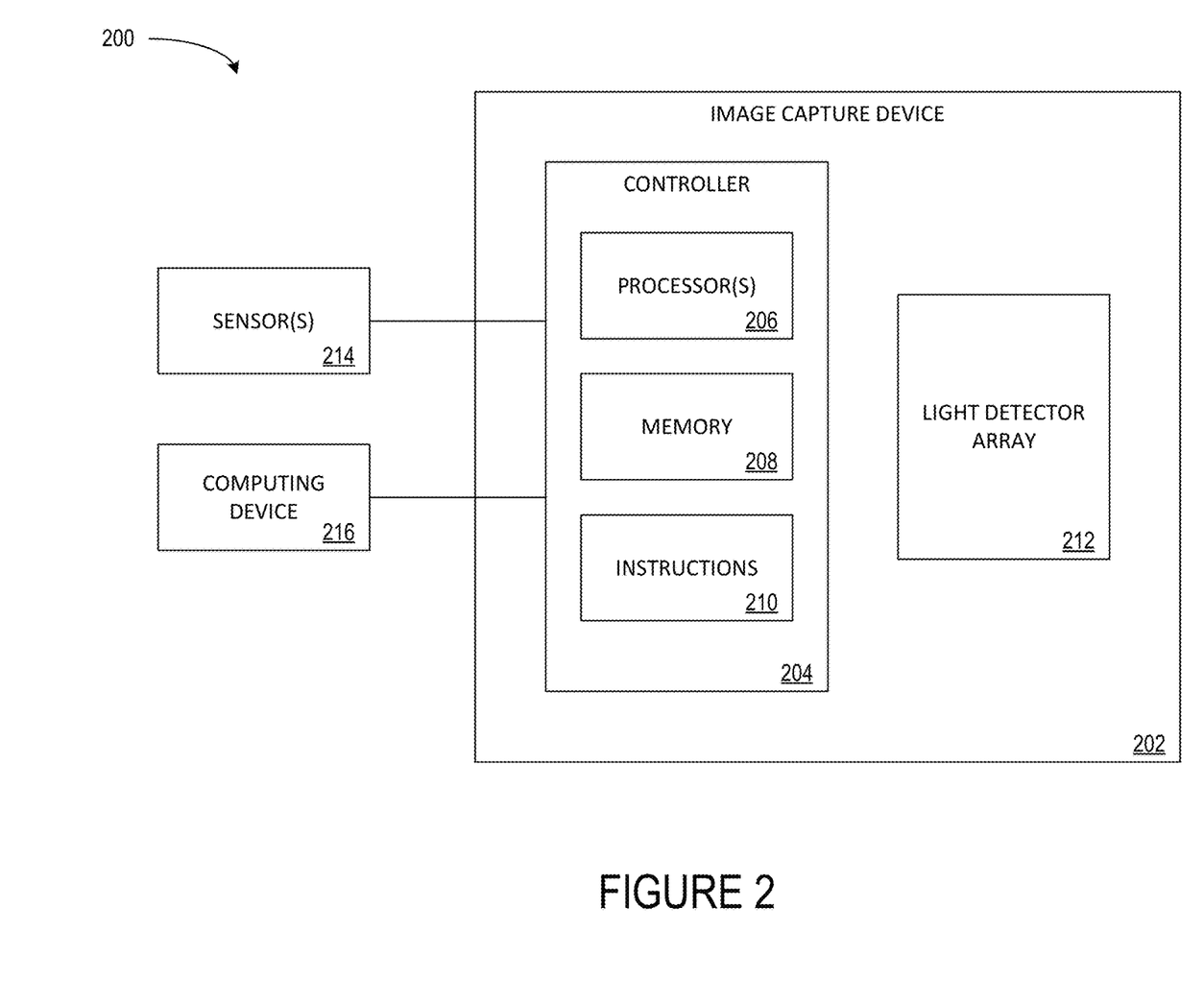
FIG. 2 is a block diagram of another system including an image capture device, according to an example embodiment.

FIG. 2 is a block diagram of another system including an image capture device, according to an example embodiment. In particular, FIG. 1 shows a system 200 that includes an image capture device 202, one or more sensors 214, and a computing device 216. The computing device 216 may be configured similarly to the system controller 102 described above with respect to FIG. 1. The image capture device 202 includes processor(s) 206, a memory 208, and instructions 210 stored in the memory 208 and executable by the processor(s) 206 to perform functions. The image capture device 202 also includes a light detector array 212.

The processor(s) 206 can include on or more processors, such as one or more general-purpose microprocessors and/or one or more special purpose microprocessors. The one or more processors may include, for instance, an application-specific integrated circuit (ASIC) or a field-programmable gate array (FPGA). Other types of processors, computers, or devices configured to carry out software instructions are contemplated herein.

The memory 208 may include a computer readable medium, such as a non-transitory computer readable medium, which may include without limitation, read-only memory (ROM), programmable read-only memory (PROM), erasable programmable read-only memory (EPROM), electrically erasable programmable read-only memory (EEPROM), non-volatile random-access memory (e.g., flash memory), a solid state drive (SSD), a hard disk drive (HDD), a Compact Disc (CD), a Digital Video Disk (DVD), a digital tape, read/write (R/W) CDs, R/W DVDs, etc.

The light detector array 212 may include a plurality of adjacent light detectors configured to provide an output in response to receiving light. Different light intensities received by a given light detector result in different outputs (e.g., voltage and/or current outputs). For example, a light detector can be a photoconductor (photoresistor), photovoltaic device (photocell), phototransistor, a photodiode, or another device capable of producing an output indicative of an intensity of light received by the light detector. Within examples, each light detector of the light detector array 212 may correspond to a pixel in an output image. Thus, within certain contexts herein, a light detector may be referred to in terms of its corresponding pixel in an image. The light detector array 212 may further include circuitry, such as a power source and connectors used for providing power to each given light detector and thereby driving an output associated with a received light intensity at the given light detector.

The image capture device 202 is configured to capture images using outputs from the light detector array 212. The controller 204 is configured to control aspects of image capture, such as exposure parameters of the image capture device 202. For example, the image capture device 202 may include a lens and a shutter, and the controller 204 can control one or more of a shutter speed and an aperture to determine how much light each detector in the light detector array 212 receives. This determines, at least in part, the intensities of each pixel in a resulting image. The controller 204 may also perform an evaluation of each image. For example, the controller 204 may determine that an image is overexposed based on pixel data of the image. This may involve determining that more than a threshold number of pixels in the output image are a maximum intensity value. The controller 204 may adjust exposure parameters in order to achieve desired pixel statistics (e.g., a desired average pixel intensity value). In multi-channel images, such as RGB images, the controller may perform the evaluation for each channel. Further examples of auto exposure using the image capture device are provided below with respect to FIGS. 3-9.

Similarly, the controller 204 may use outputs from the one or more sensors 214 to control how images are captured. For example, a location sensor (e.g., GPS), a time sensor (e.g., a clock), or a light sensor may provide a signal indicating an operational context of the image capture device 202 that causes the image capture device to adjustment to one or more parameters for capturing images. For example, a time signal, location signal, or light signal may indicate an expected shift in lighting that prompts the image capture device 202 to change operation modes. In other examples, the computing device 216 may prompt such adjustments to parameters of the image capture device 202. For example, the computing device 216 may send a control signal to the controller 204 indicating that the controller 204 should capture images in a different manner. For example, the computing device 216 may use images from the image capture device 202 to perform object detection operations. The computing device 216 may assign a confidence level indicative of the likelihood that an object was accurately detected, and may prompt changes to auto exposure based on the confidence level. Other types of control signals from the computing device 216 are possible.

Figure 3:
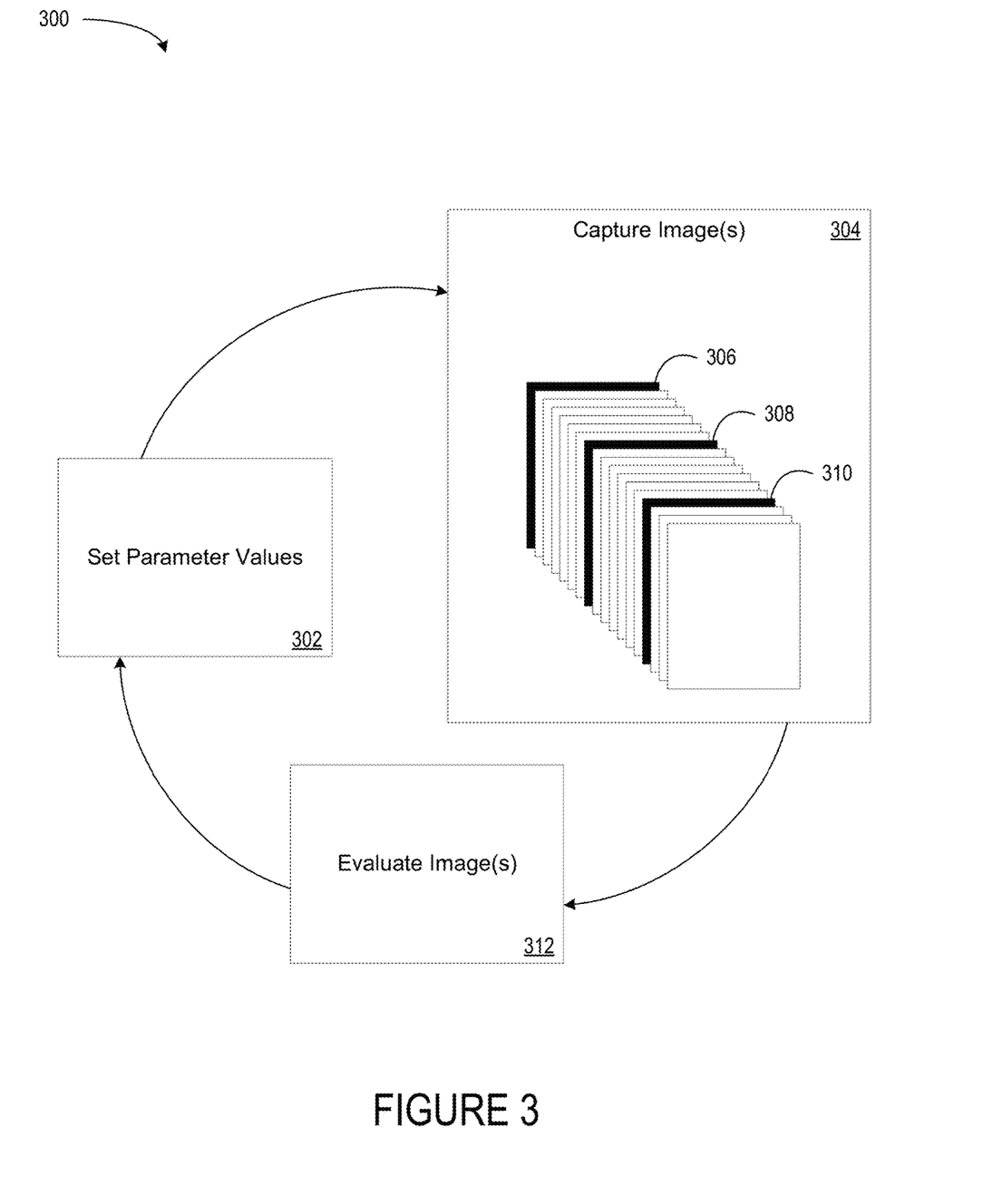
FIG. 3 is a block diagram of a simplified method of automatic exposure of an image, according to an example embodiment.

FIG. 3 is a block diagram of a simplified method of automatic exposure of an image, according to an example embodiment. In particular, FIG. 3 shows a method 300 that can be performed by system 100, system 200, or components thereof. For example, the image capture device 110 or the image capture device 202, either alone or in combination with one or more computing devices, can be used to carry out functions in method 300.

At block 302, method 300 includes setting parameter values for capturing one or more images. For example, the parameter values may correspond to an aperture, shutter speed, and detector sensitivity (e.g., an ISO rating) of an image capture device.

At block 304, method 300 includes capturing one or more images using the image capture device. In FIG. 3, a plurality of sequentially-related images are shown, including image 306, image 308, and image 310. Some images may be sampled from the plurality of images for purposes of object detection, edge detection, or other image processing techniques. While only some of the images might be sampled, each image can be used for adjusting parameter values of the image capture device. This allows for an image capture device to provide images that are more effective for image processing operations performed by the image capture device or another computing device.

At block 312, method 300 includes evaluating the one or more images. For example, the image capture device or a separate computing device may analyze pixel statistics to determine if an image is overexposed (e.g., by determining that an average pixel intensity exceeds a threshold intensity.

Block 312 progresses again to block 302, such that parameter values for additional images can be set. In this manner, the image capture device can re-adjust the exposure parameters adaptively as lighting characteristics of the environment change. Further details of adaptive auto exposure are described below with respect to FIGS. 4-9.

III. Example Auto Exposure Scenario

FIGS. 4-8D show an example scenario in which a multi-channel image is exposed in accordance with a plurality of different auto exposure implementations. The following examples show one context in which an image capture device may automatically switch operation modes, or in which a sensor or another computing device may provide a signal that prompts the image capture device to switch operation modes. In the following description, it should be understood that an "input image" refers to an image initially captured by an image capture device. The input image is used for determining exposure parameters for capturing one or more subsequent images. An "output image" refers to an image captured using the exposure parameters determined from the input image.

Figure 4:
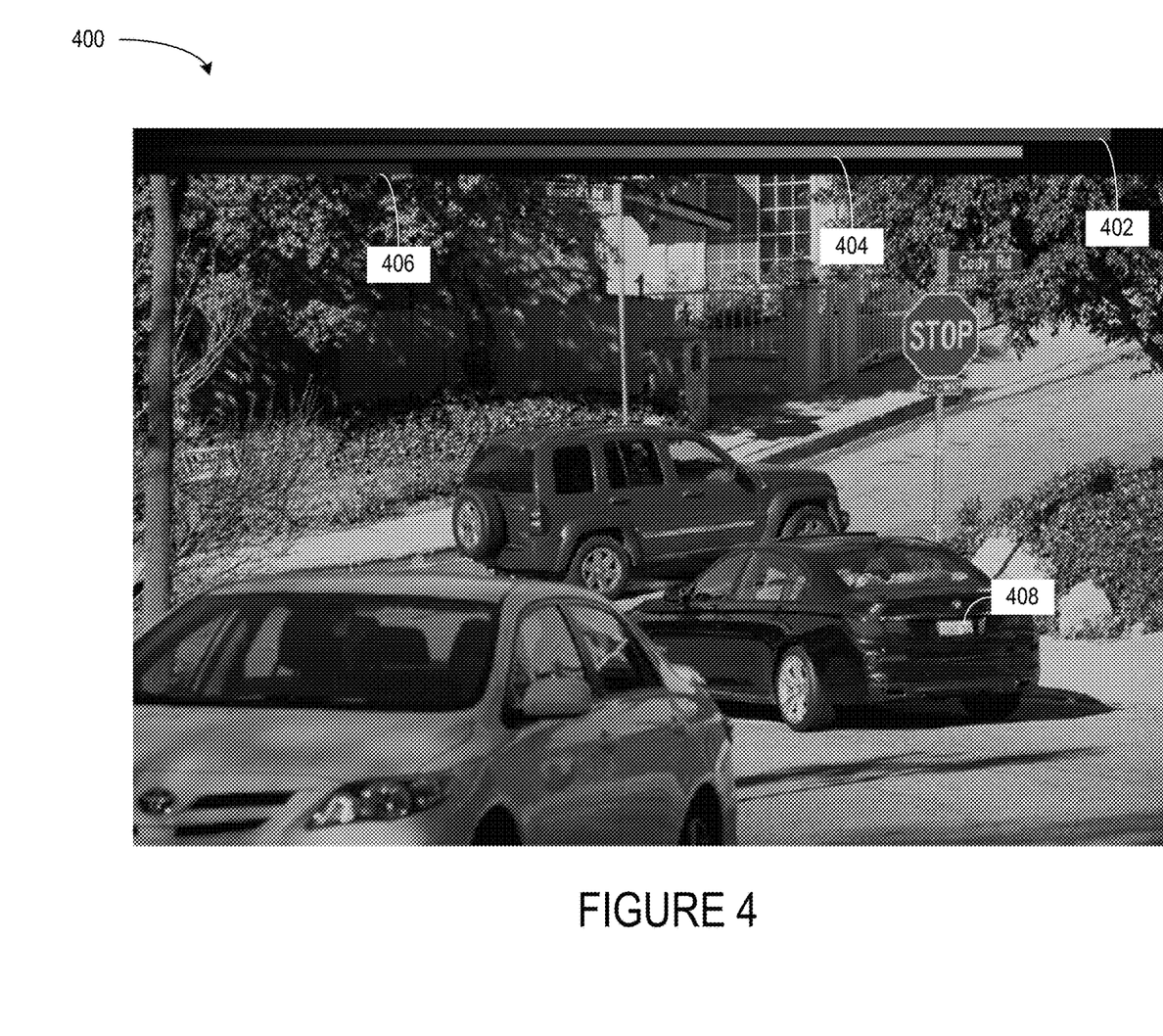
FIG. 4 is an input image, according to an example embodiment.

FIG. 4 is an input image, according to an example embodiment. In particular, FIG. 4 shows an input image 400 captured using initial exposure parameters. FIG. 4 also shows a representation of average pixel intensities for each channel (red channel 402, green channel 404, and blue channel 406) of the input image 400. Each channel is represented by a bar that extends from a left to right in FIG. 4. A bar reaching the right edge of FIG. 4 indicates that the corresponding channel is saturated and overexposed. As shown in FIG. 4, the red channel 402 and the green channel 404 have notably higher pixel intensities relative to the blue channel 406. This may be due to lighting conditions in the environment. For example, sunrise or sunset can increase the amount of red light in the environment, while limiting blue light. Thus, if the input image 400 is captured using fixed white balance gains optimized for daylight, an image with imbalanced channels results. Other scenarios might have similar effects on lighting, such as entering an area with primarily artificial lighting, such as a roadway tunnel.

FIG. 4 also shows an object 408 in the environment. In this example, the object 408 is a license plate, though other objects might be of interest in a given scene, such as vehicles, street signs, or other objects that can be detected using image processing techniques. Further details regarding the object 408 are provided below with respect to FIG. 8A.

Figure 5:
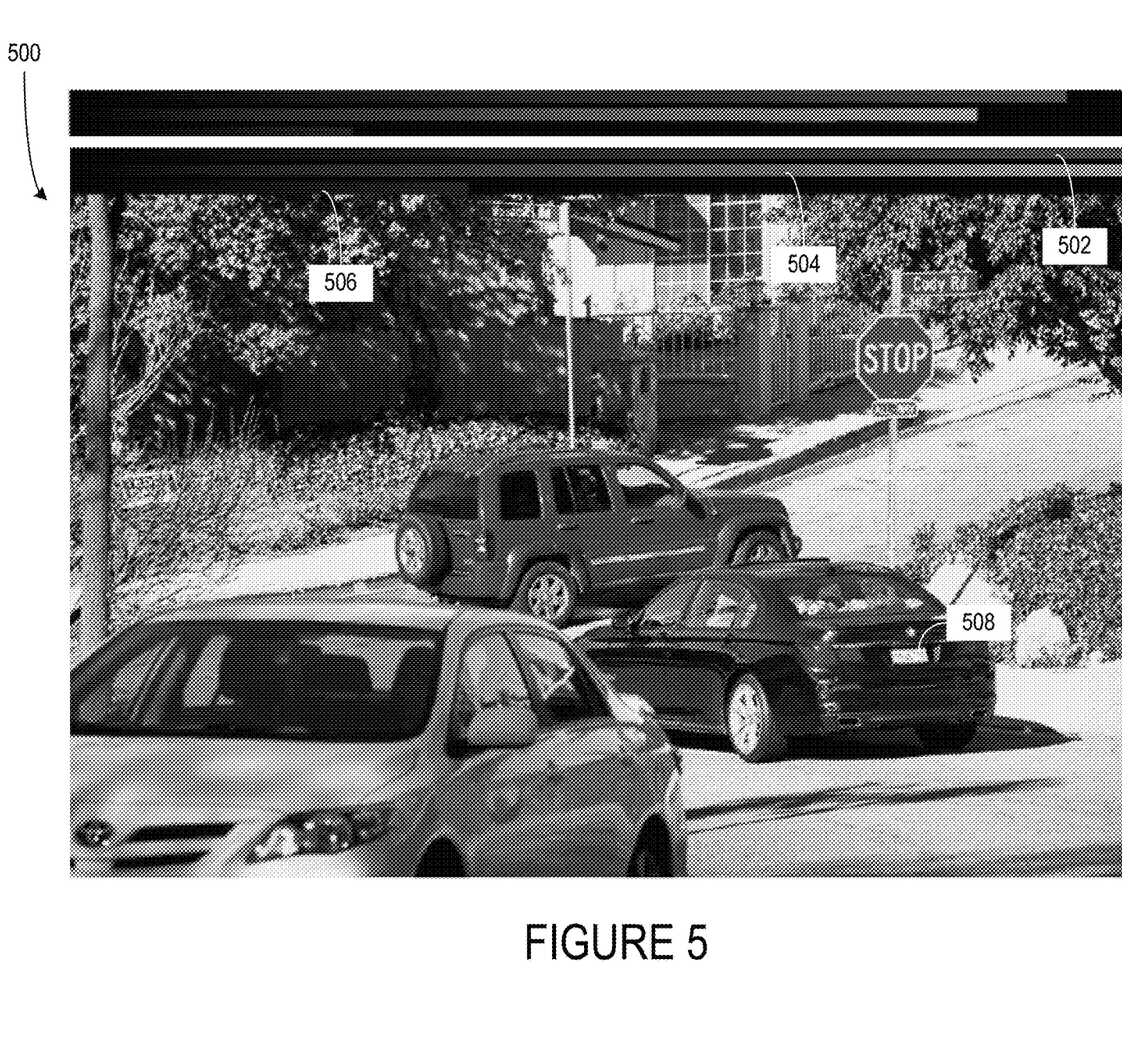
FIG. 5 is an output image using non-weighted automatic exposure, according to an example embodiment.

FIG. 5 is an output image using non-weighted automatic exposure, according to an example embodiment. In particular, FIG. 5 shows a first output image 500 captured using exposure parameters that are based on a non-weighted average of pixel intensities of the input image 400. FIG. 5 also shows a representation of average pixel intensities for each channel (red channel 502, green channel 504, and blue channel 506) of the first output image 500.

In the example scenario, exposure parameters are set for the first output image 500 that apply a gain relative to the input image 400 based on a desired average pixel intensity. For example the desired average pixel intensity may be a desired average of all pixels in the image (e.g., an intensity of 100 for a byte image ranging from 0 to 255 brightness levels). The gain may be calculated as $D*3/(R+G+B)$, where D is the desired average pixel intensity, R is the average intensity of the red channel, G is the average intensity of the green channel, and B is the average intensity of the blue channel.

In the input image 400, the average across all channels $((R+G+B)/3)$ is around 71 out of 255, the desired average pixel intensity is 100 out of 255, and a gain of about 1.41 results. As shown in FIG. 5, the red channel 502 and the green channel 504 have notably higher pixel intensities relative to the blue channel 506. Further, the red channel 502 and the green channel 504 are overexposed, resulting in at least some pixels being clipped in the first output image 500. This illustrates an example of how a non-weighted average may result in exposure parameters that overexpose one or more channels (the red channel 502 and the green channel 504) when there is an outlier channel in the input image (the blue channel 406).

The average pixel intensities of red, blue, a green channels from the input image 400 are reproduced for reference above the first output image 500. This illustrates a difference between the input image 400 and the first output image 500 resulting from altering exposure parameters. As shown in FIG. 5, a gain was applied that resulted in overexposing the red channel 502 and the green channel 504.

FIG. 5 also shows an object 508 in the environment. Further details regarding the object 508 are provided below with respect to FIG. 8B.

Figure 6:
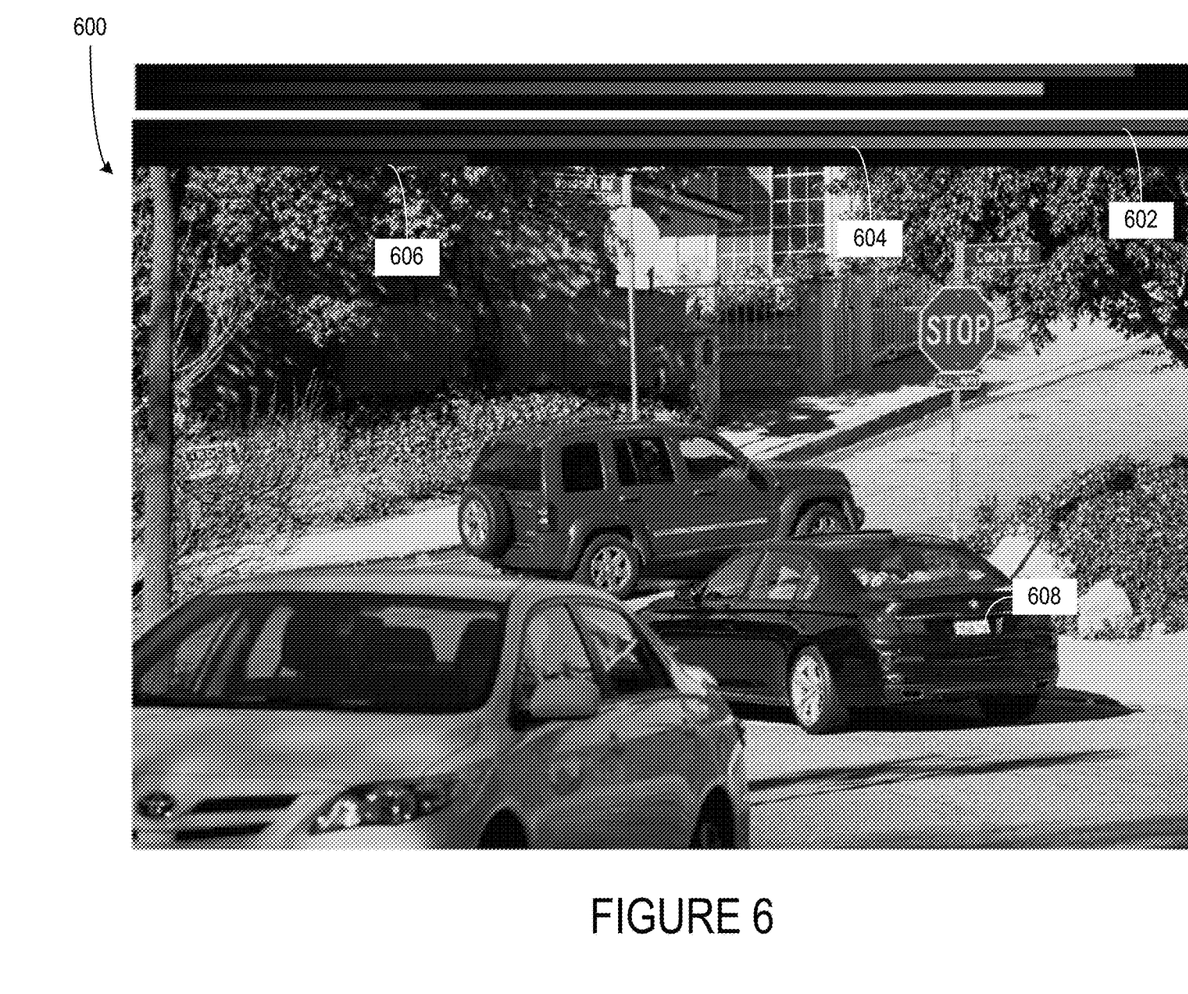
FIG. 6 is an output image using channel-weighted automatic exposure, according to an example embodiment.

FIG. 6 is an output image using channel-weighted automatic exposure, according to an example embodiment. In particular, FIG. 6 shows a second output image 600 captured using exposure parameters that are based on a channel-weighted average of pixel intensities of the input image 400. FIG. 6 also shows a representation of average pixel intensities for each channel (red channel 602, green channel 604, and blue channel 606) of the second output image 600.

In the example scenario, exposure parameters are set for the second output image 600 that apply a gain relative to the input image 400 based on a desired average pixel intensity. For example the desired average pixel intensity may be a desired average of all pixels in the image (e.g., a brightness of 100 for a byte image ranging from 0 to 255 brightness levels). The gain may be calculated using a weighted average of the channels. For example, the gain can be D/(x*R+ y*G+z*B), where D is the desired average pixel intensity, R is the average intensity of the red channel, G is the average intensity of the green channel, and B is the average intensity of the blue channel. Weights x, y, and z can be determined in order to mitigate possible overexposure of one or more channels. For example, a luma-equivalent set of weights (0.2126 for R, 0.7152 for G, and 0.072 for B) can be used.

In the input image 400, the weighted average across all channels (0.2126*R+0.7152*G+0.072*B) is around 85 out of 255, the desired average pixel intensity is 100 out of 255, and a gain of about 1.18 results. This is less than the example gain of 1.41 associated with the non-weighted average of FIG. 5. As shown in FIG. 6, the red channel 602 and the green channel 604 have notably higher pixel intensities relative to the blue channel 606. However, unlike FIG. 5, the green channel 604 is not overexposed in FIG. 6. This illustrates an example of how a channel-weighted average may result in exposure parameters that are less likely to overexpose channels than a non-weighted average, even in scenarios with an outlier channel in the input image (the blue channel 406).

The average pixel intensities of red, blue, and green channels from the input image 400 are reproduced for reference above the second output image 600. This illustrates a difference between the input image 400 and the second output image 600 resulting from altering exposure parameters. As shown in FIG. 6, a gain was applied that resulted in overexposing the red channel 602. Accordingly, in contexts like that in FIG. 6 where one channel (blue channel 606) is an outlier, different weights could be applied to achieve an output image that is more effective for image processing.

FIG. 6 also shows an object 608 in the environment. Further details regarding the object 608 are provided below with respect to FIG. 8C.

Figure 7:
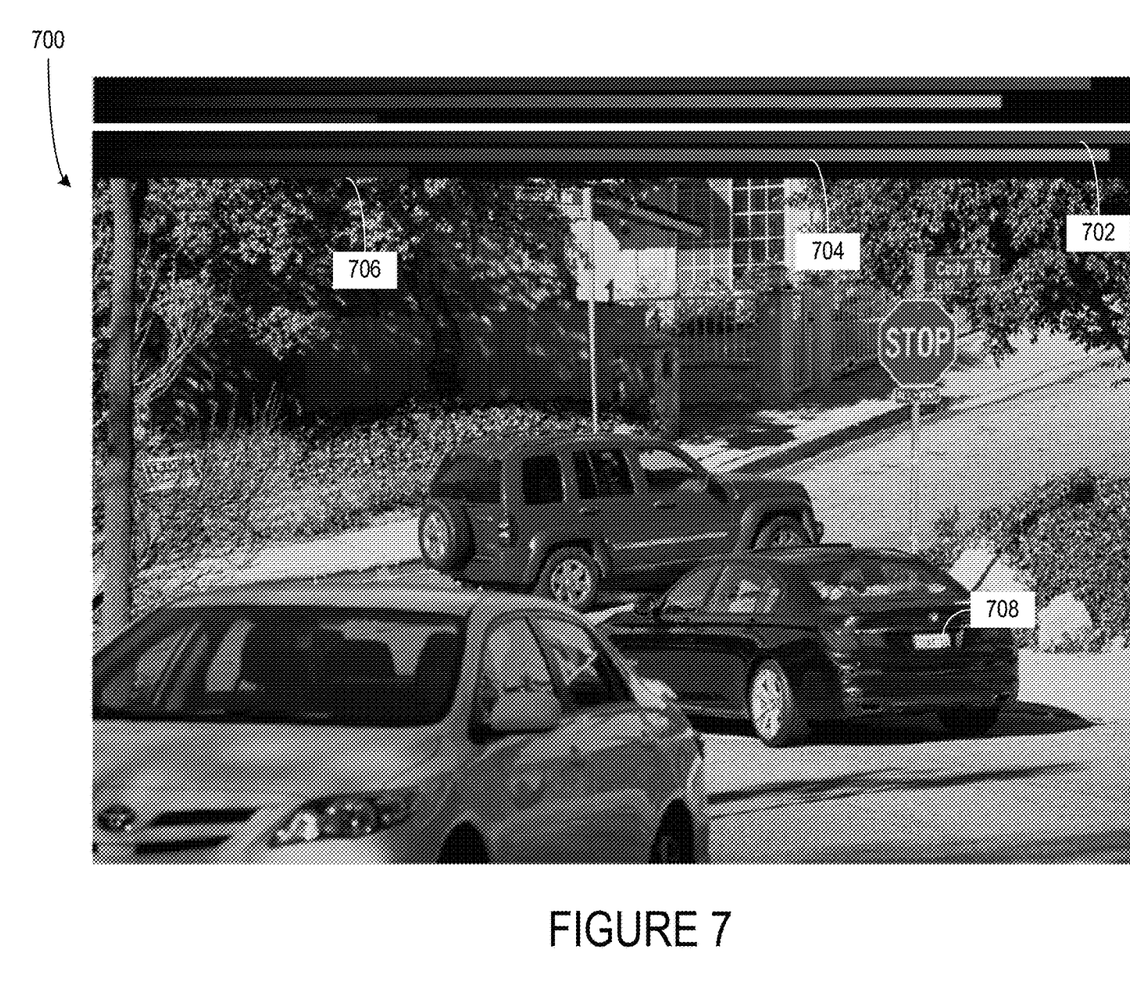
FIG. 7 is an output image using selective channel-weighted automatic exposure, according to an example embodiment.

FIG. 7 is an output image using selective channel-weighted automatic exposure, according to an example embodiment. In particular, FIG. 7 shows a third output image 700 captured using exposure parameters that are based on a selective channel-weighted average of pixel intensities of the input image 400. FIG. 7 also shows a representation of average pixel intensities for each channel (red channel 702, green channel 704, and blue channel 706) of the third output image 700.

In the example scenario, exposure parameters are set for the third output image 700 that apply a gain relative to the input image 400 based on a desired average pixel intensity. For example the desired average pixel intensity may be a desired average of all pixels in the image (e.g., a brightness of 100 for a byte image ranging from 0 to 255 brightness levels). The gain may be calculated using a weighted average of the channels other than an outlier channel. For example, FIG. 4 shows that the blue channel 406 is an outlier relative to the red channel 402 and the green channel 404. This can be determined based on one or more thresholds. For example, a difference in average pixel intensity can be determined between each channel, and if a given channel has an average difference above a threshold difference (e.g., greater than 30% of the desired average pixel intensity), then the channel is considered an outlier. Other thresholds can be used as well. In the present example, the average intensity for the blue channel 406 is 25, the average intensity for the red channel 402 is 102, and the average intensity for the green channel 404 is 85. The blue channel 406 has intensity differences of 77 and 60 relative to the red and blue channels respectively. Accordingly, the average difference for the blue channel 406 is 68.5, making the blue channel an outlier. This may trigger the image capture device to use a selective channel-weighted average for determining exposure parameters for the third output image 700.

In examples in which a channel is omitted from a channel-weighted average, the other weights are adjusted to output the gain. In the example scenario of FIG. 7, gain be D/(x*R+y*G+0*B), where D is the desired average pixel intensity, R is the average intensity of the red channel, G is the average intensity of the green channel, and B is the average intensity of the blue channel. B is multiplied by 0 in order to remove the blue channel 406 from the weighted average. In an example using luma-equivalent set of weights (0.2126 for R, 0.7152 for G, and 0.072 for B), the weights are adjusted to account for removing the weights attributed to the blue channel by normalizing the sum of the set of weights. In the example scenario of FIG. 7, this is done by adjusting x from 0.2126 to 0.2486 and y is adjusted from to 0.71520 to 0.7512. This results in a gain of 1.12.

As shown in FIG. 7, the red channel 702 and the green channel 704 still have notably higher pixel intensities relative to the blue channel 706. However, in FIG. 7 the green channel 704 is less exposed than the green channel 604 in FIG. 6. Further, though the red channel 702 is overexposed, fewer pixels are clipped in the third output image 700 than in the second output image 600 because the gain for the third output image 700 (1.12) is less than that in the second output image 600 (1.18). This illustrates an example of how a selective channel-weighted average may result in exposure parameters that are less likely to overexpose channels than a non-weighted average or a weighted average, particularly in scenarios with an outlier channel in the input image (the blue channel 406).

The average pixel intensities of red, blue, a green channels from the input image 400 are reproduced for reference above the third output image 700. This illustrates a difference between the input image 400 and the third output image 700 resulting from altering exposure parameters. As shown in FIG. 7, a gain was applied that resulted in overexposing the red channel 702. Accordingly, in contexts like that in FIG. 7 where one channel (blue channel 706) is an outlier, different weights (e.g., non-luma equivalent weights) could be applied to achieve an output image that is more effective for image processing.

FIG. 7 also shows an object 708 in the environment. Further details regarding the object 708 are provided below with respect to FIG. 8D.

Figure 8A:
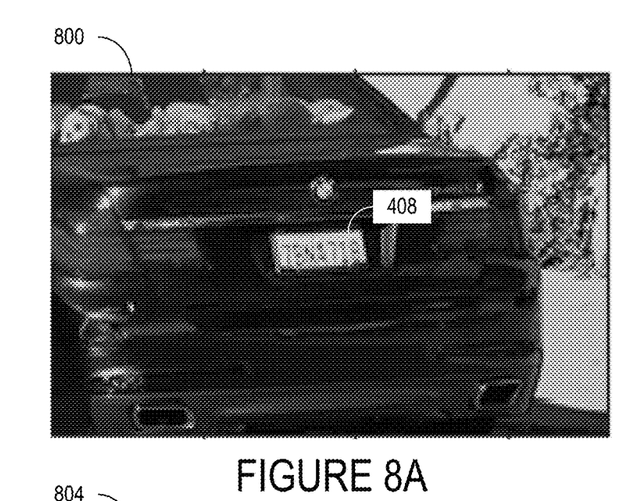
FIG. 8A is a portion of the input image, according to an example embodiment.

FIG. 8A is a portion 800 of the input image 400, according to an example embodiment. In particular, FIG. 8A shows a close-up view of the object 408. The object 408 is depicted as a license plate, though other objects are represented in the input image 400 and may be relevant depending on context. For example, the license plate is on a vehicle that may be detected using an image for purposes of navigating a vehicle associated with the image capture device. FIG. 8A shows that the license plate in the input image 400 is legible.

Figure 8B:
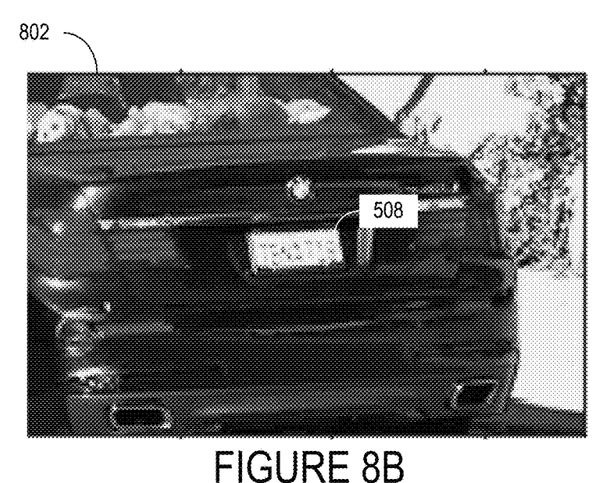
FIG. 8B is a portion of the output image using non-weighted automatic exposure, according to an example embodiment.

FIG. 8B is a portion of the output image using non-weighted automatic exposure, according to an example embodiment. In particular, FIG. 8B shows a portion 802 of the first output image 500. FIG. 8B shows a close-up view of the object 508, which is depicted as a license plate. The license plate in the first output image 500 is less legible than the license plate depicted in the input image 400. This decrease in legibility is due to overexposure of the red channel 502 and the green channel 504 in the first output image 500. Accordingly, FIG. 8B illustrates how typical auto exposure operations (e.g., using a non-weighted average) for a multi-channel image may be less suitable in certain environments.

Figure 8C:
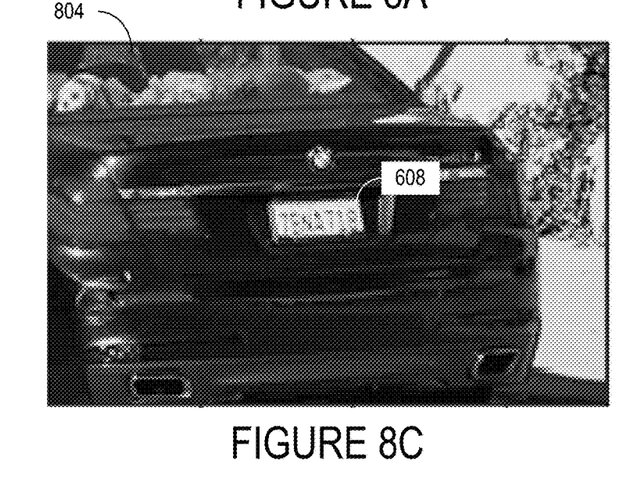
FIG. 8C is a portion of the output image using channel-weighted automatic exposure, according to an example embodiment.

FIG. 8C is a portion of the output image using channel-weighted automatic exposure, according to an example embodiment. In particular, FIG. 8C shows a portion 804 of the second output image 600. FIG. 8C shows a close-up view of the object 608, which is depicted as a license plate. The license plate in the second output image 600 is as legible as, or more legible than, the license plate depicted in the input image 400. This is due to lessened overexposure of the red channel 602 and the green channel 604 in the second output image 600 relative to the first output image 500. In addition, the average pixel intensity of the second output image 600 is closer to the desired average pixel intensity of 100 relative to the input image 400. Accordingly, FIG. 8C illustrates how using a weighted average for auto exposure operations for a multi-channel image may be more suitable than a non-weighted average in certain environments.

Figure 8D:
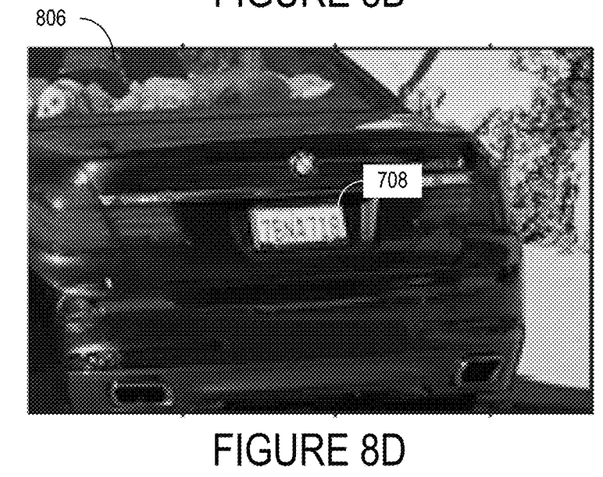
FIG. 8D is a portion of the output image using selective channel-weighted automatic exposure, according to an example embodiment.

FIG. 8D is a portion of the output image using selective channel-weighted automatic exposure, according to an example embodiment. In particular, FIG. 8D shows a portion 808 of the third output image 700. FIG. 8D shows a close-up view of the object 708, which is depicted as a license plate. The license plate in the third output image 700 is as legible as, or more legible than, the license plate depicted in the input image 400. This is due to lessened overexposure of the red channel 702 and the green channel 704 in the second output image 600 relative to the first output image 500 and the second output image 600. In addition, the average pixel intensity of the third output image 700 is closer to the desired average pixel intensity of 100 relative to the input image 400. Accordingly, FIG. 8D illustrates how using a selective weighted average for auto exposure operations for a multi-channel image may be more suitable than a non-weighted average in certain environments.

FIGS. 8A-8D show an example scenario in which lighting conditions cause auto exposure operations of a first mode of an image capture device (e.g., a non-weighted average mode) to overexpose one or more channels in an output image. In such a scenario, a second mode of the image capture device may be used to switch the auto exposure operations so that they are better suited for the lighting conditions. For example, the second mode can use a channel-weighted average or selective channel-weighted average to determine a gain that decreases the likelihood of overexposing one or more channels. Further details regarding these operations are described below with respect to FIG. 9.

III. Example Methods

Figure 9:
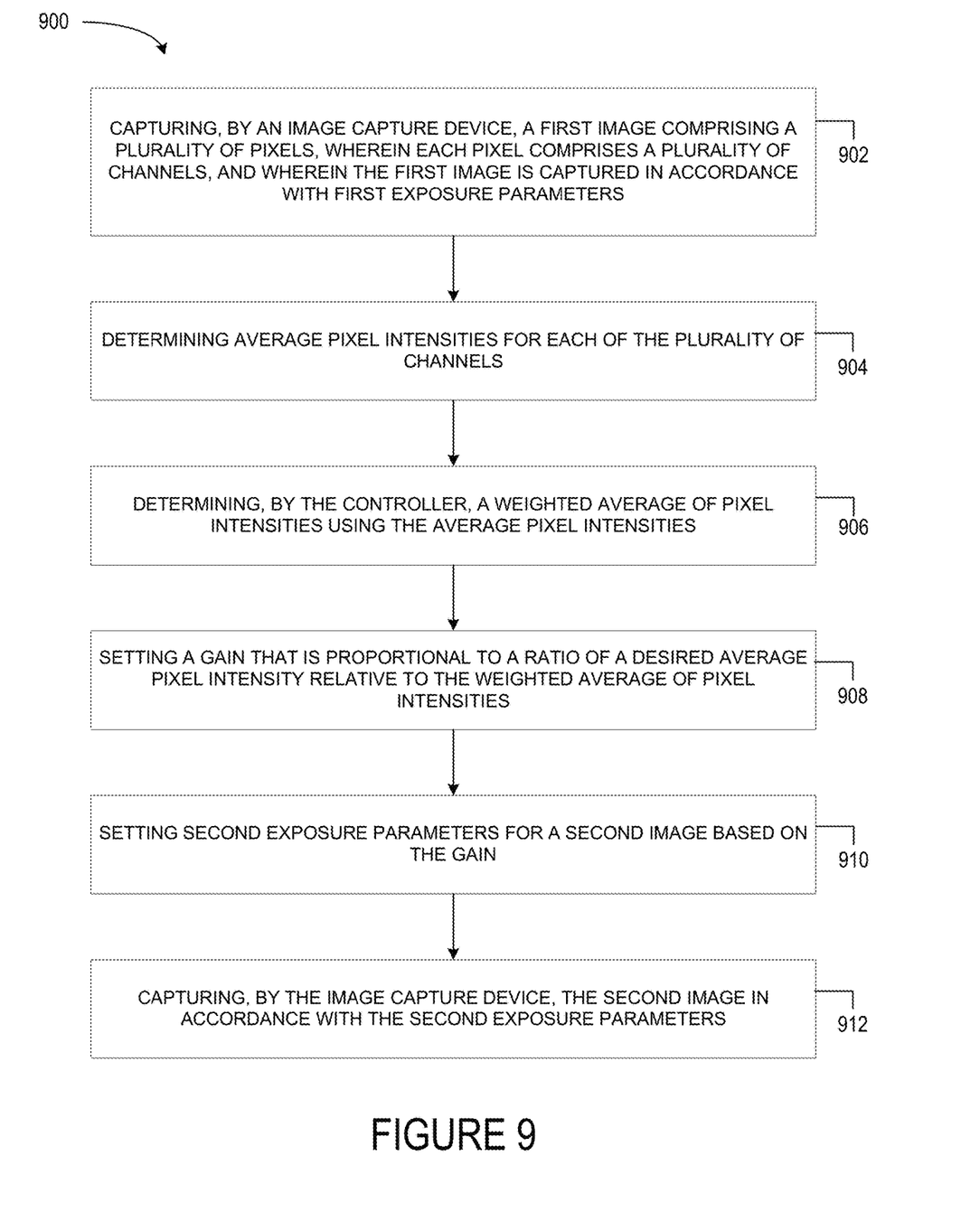
FIG. 9 is a block diagram of a method, according to an example embodiment.

FIG. 9 is a block diagram of a method, according to an example embodiment. In particular, FIG. 9 depicts a method 900 for use in capturing images using an image capture device. Method 900 may be implemented in accordance with system 100, system 200, or the description thereof. For example, aspects of the functions of method 900 may be performed by the system controller 102, the image capture device 202, or by logical circuitry configured to implement the functions described above with respect to FIGS. 1-8D.

At block 902, method 900 includes capturing, by an image capture device, a first image comprising a plurality of pixels, wherein each pixel comprises a plurality of channels, and wherein the first image is captured in accordance with first exposure parameters. For example, the first image can be an RBG image captured using a first combination of aperture, shutter speed, and detector sensitivity for the image capture device. For example, the input image 400 depicted in FIG. 4 may be an example of the first image.

At block 904, method 900 includes determining, by a controller of the image capture device, average pixel intensities for each of the plurality of channels.

At block 906, method 900 includes determining, by the controller, a weighted average of pixel intensities using the average pixel intensities. For example, the weighted average of pixel intensities could correspond to luma-equivalent weights for an RGB image, or another set of weights. For example, block 906 may be performed in accordance with the description of FIGS. 6 and 7.

At block 908, method 900 includes setting a gain, by the controller, that is proportional to a ratio of a desired average pixel intensity relative to the weighted average of pixel intensities. For example, the gain may equal the desired average pixel intensity (e.g., 100 out of 255) divided by the weighted average. For example, block 908 may be performed in accordance with the description of FIGS. 6 and 7.

At block 910, method 900 includes setting, by the controller, second exposure parameters for a second image. The second exposure parameters are based on the gain. For example, one or more of an aperture, shutter speed, or detector sensitivity can be determined to provide the determined gain.

At block 912, method 900 includes capturing, by the image capture device, the second image in accordance with the second exposure parameters.

Within examples, method 900 further includes determining an operational condition associated with the image capture device. In these examples, determining the average pixel intensities (block 904), determining the weighted average (block 906), and setting the gain (block 908) are performed responsive to determining the operational condition of the image capture device. For example, the operational condition may include an expected shift in lighting of one or more of the channels. For example, this expected shift in lighting may correspond to a time of day. For example, the time of day may be associated with sunrise or sunset on that day. In other examples, the image capture device is coupled to a vehicle, and the expected shift in lighting corresponds to a location of the vehicle, such as a tunnel or another location with primarily artificial lighting.

Within examples, method 900 further includes determining that at least two of the plurality of channels are overexposed based on pixel data from the first image. For example, the first image may be an auto exposed image that has become overexposed due to lighting conditions in the environment. In these examples, determining the average pixel intensities (block 904), determining the weighted average (block 906), and setting the gain (block 908) are performed responsive to determining that at least two of the plurality of channels are overexposed.

Within examples, the plurality of channels includes a red channel, a green channel, and a blue channel, and determining the weighted average includes weighting the average pixel values for each channel using a luminosity function. For example, luma-equivalent weights can be used for each channel.

Within examples, determining the weighted average includes determining an outlier channel from the plurality of channels, determining the weighted average based on channels other than the outlier channel. In these examples, determining the outlier channel may include determining differences in average pixel intensities between each of the plurality of channels and identifying the outlier channel based on the outlier channel corresponding to a plurality of differences in average pixel intensities that exceed a threshold intensity difference. The threshold intensity difference can be greater than or equal to 30% of a target pixel intensity. For example, this may be performed in accordance with FIG. 7 and the description thereof.

Within examples, the second image immediately follows the first image in a sequence of images, and setting the second exposure parameters for the second image comprises adjusting the first exposure parameters to levels that correspond to a target pixel intensity based on the weighted average of pixel intensities.

Within examples, the first exposure parameters and the second exposure parameters include one or more of a shutter speed of the image capture device or a lens aperture of the image capture device.

Within examples, method 900 further includes identifying an object using the first image. In these examples, determining the average pixel intensities (block 904), determining the weighted average (block 906), and setting the gain (block 906) are performed based on identifying the object. For example, identifying the object using the first image may include identifying a first object (e.g., a vehicle) using the first image. Determining the average pixel intensities (block 904), determining the weighted average (block 906), and setting the gain (block 906) can be performed responsive to identifying the first object in order to identify a related second object (e.g., a license plate on the vehicle) based on the first image.

Though particular embodiments described herein describe RGB images, other multi-channel images are contemplated. Further, though luma-equivalent weights are described for a channel-weighted average, other sets of weights are possible, and may depend on an expected shift in lighting within the environment. For example, the weights may be configured to lessen the relative intensity of one or more channels. Other examples of weights are possible.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

A step or block that represents a processing of information can correspond to circuitry that can be configured to perform the specific logical functions of a herein-described method or technique. Alternatively or additionally, a step or block that represents a processing of information can correspond to a module, a segment, a physical computer (e.g., a field programmable gate array (FPGA) or application-specific integrated circuit (ASIC)), or a portion of program code (including related data). The program code can include one or more instructions executable by a processor for implementing specific logical functions or actions in the method or technique. The program code and/or related data can be stored on any type of computer readable medium such as a storage device including a disk, hard drive, or other storage medium.

The computer readable medium can also include non-transitory computer readable media such as computer-readable media that store data for short periods of time like register memory, processor cache, and random access memory (RAM). The computer readable media can also include non-transitory computer readable media that store program code and/or data for longer periods of time. Thus, the computer readable media may include secondary or persistent long term storage, like read only memory (ROM), optical or magnetic disks, compact-disc read only memory (CD-ROM), for example. The computer readable media can also be any other volatile or non-volatile storage systems. A computer readable medium can be considered a computer readable storage medium, for example, or a tangible storage device.

While various examples and embodiments have been disclosed, other examples and embodiments will be apparent to those skilled in the art. The various disclosed examples and embodiments are for purposes of illustration and are not intended to be limiting, with the true scope being indicated by the following claims.

What is claimed is:

1. A method comprising:
   capturing, by an image capture device, a first image comprising a plurality of pixels, wherein each pixel comprises a plurality of channels, and wherein the first image is captured in accordance with first exposure parameters;
   determining, by a controller of the image capture device, average pixel intensities for each of the plurality of channels;
   determining, by the controller, a weighted average of pixel intensities using the average pixel intensities;
   setting, by the controller, a gain that is proportional to a ratio of a desired average pixel intensity relative to the weighted average of pixel intensities;
   setting, by the controller, second exposure parameters for a second image based on the gain; and
   capturing, by the image capture device, the second image in accordance with the second exposure parameters.

2. The method of claim 1, further comprising:
   determining an operational condition associated with the image capture device,
   wherein determining the average pixel intensities, determining the weighted average, and setting the gain are performed responsive to determining the operational condition of the image capture device.

3. The method of claim 2, wherein the operational condition comprises an expected shift in lighting of one or more of the channels.

4. The method of claim 3, wherein the expected shift in lighting corresponds to a time of day.

5. The method of claim 3, wherein the image capture device is coupled to a vehicle, and wherein the expected shift in lighting is based on a location of the vehicle.

6. The method of claim 1, further comprising:
   determining that at least two of the plurality of channels are overexposed based on pixel data from the first image,
   wherein determining the average pixel intensities, determining the weighted average, and setting the gain are performed responsive to determining that at least two of the plurality of channels are overexposed.

7. The method of claim 1, wherein the plurality of channels comprise a red channel, a green channel, and a blue channel, and wherein determining the weighted average comprises weighting the average pixel values for each channel using a luminosity function.

8. The method of claim 1, wherein determining the weighted average comprises:
   determining an outlier channel from the plurality of channels; and determining the weighted average based on channels other than the outlier channel.

9. The method of claim 8, wherein determining the outlier channel comprises
determining differences in average pixel intensities between each of the plurality of channels;
identifying the outlier channel based on the outlier channel corresponding to a plurality of differences in average pixel intensities that exceed a threshold intensity difference.

10. The method of claim 9, wherein the threshold intensity difference is greater than or equal to 30% of a target pixel intensity.

11. The method of claim 1, wherein the second image immediately follows the first image in a sequence of images, and wherein setting the second exposure parameters for the second image comprises adjusting the first exposure parameters to levels that correspond to a target pixel intensity based on the weighted average of pixel intensities.

12. The method of claim 1, wherein the first exposure parameters and the second exposure parameters comprise one or more of a shutter speed of the image capture device or a lens aperture of the image capture device.

13. The method of claim 1, further comprising:
identifying an object using the first image,
wherein determining the average pixel intensities, determining the weighted average, and setting the gain are performed based on identifying the object.

14. The method of claim 13, wherein determining the average pixel intensities, determining the weighted average, and setting the gain are performed in order to identify a related second object based on the first image.

15. An image capture device comprising:
a light detector array; and
a controller comprising:
one or more processors;
a memory; and
program instructions stored in the memory and executable by the one or more processors to perform functions comprising:
using the light detector array to capture a first image comprising a plurality of pixels, wherein each pixel comprises a plurality of channels, and
wherein the first image is captured in accordance with first exposure parameters;
determining average pixel intensities for each of the plurality of channels;
determining a weighted average of pixel intensities using the average pixel intensities;
setting a gain that is proportional to a ratio of a desired average pixel intensity relative to the weighted average of pixel intensities;
setting second exposure parameters for a second image based on the gain; and
using the light detector array to capture the second image in accordance with the second exposure parameters.

16. The image capture device of claim 15, wherein the image capture device operates in a first mode and a second mode, the functions further comprising:
receiving a signal to switch from the first mode to the second mode,
wherein determining the average pixel intensities, determining the weighted average, and setting the gain are performed responsive to receiving a signal to switch from the first mode to the second mode.

17. The image capture device of claim 16, wherein the image capture device is part of a system coupled to a vehicle, and wherein the signal to switch from the first mode to the second mode is a control signal from a system controller of the system.

18. The image capture device of claim 15, wherein determining the weighted average comprises:
determining an outlier channel from the plurality of channels; and
determining the weighted average based on channels other than the outlier channel.

19. The image capture device of claim 18, wherein determining the outlier channel comprises
determining differences in average pixel intensities between each of the plurality of channels;
identifying the outlier channel based on the outlier channel corresponding to a plurality of differences in average pixel intensities that exceed a threshold intensity difference.

20. A non-transitory computer readable medium having instructions stored thereon, that when executed by one or more processors cause performance of functions comprising:
capturing, by an image capture device, a first image comprising a plurality of pixels, wherein each pixel comprises a plurality of channels, and wherein the first image is captured in accordance with first exposure parameters;
determining average pixel intensities for each of the plurality of channels;
determining a weighted average of pixel intensities using the average pixel intensities;
setting a gain that is proportional to a ratio of a desired average pixel intensity relative to the weighted average of pixel intensities;
setting second exposure parameters for a second image based on the gain; and
capturing the second image in accordance with the second exposure parameters.

* * * * *